(12) United States Patent
Tai

(10) Patent No.: US 10,358,291 B2
(45) Date of Patent: Jul. 23, 2019

(54) PICKING SYSTEM AND PICKING METHOD

(71) Applicant: MURATA MACHINERY, LTD., Kyoto-shi, Kyoto (JP)

(72) Inventor: Akito Tai, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 157 days.

(21) Appl. No.: 15/502,256

(22) PCT Filed: Jun. 15, 2015

(86) PCT No.: PCT/JP2015/067147
§ 371 (c)(1),
(2) Date: Feb. 7, 2017

(87) PCT Pub. No.: WO2016/031351
PCT Pub. Date: Mar. 3, 2016

(65) Prior Publication Data
US 2017/0233188 A1 Aug. 17, 2017

(30) Foreign Application Priority Data

Aug. 26, 2014 (JP) ................................. 2014-171757

(51) Int. Cl.
*B65G 1/04* (2006.01)
*B65G 1/137* (2006.01)

(52) U.S. Cl.
CPC ......... *B65G 1/1378* (2013.01); *B65G 1/0407* (2013.01); *B65G 1/0457* (2013.01); *B65G 1/0492* (2013.01)

(58) Field of Classification Search
CPC .................................................. B65G 1/0407

USPC .......................... 414/281, 273, 274, 785, 807
See application file for complete search history.

(56) References Cited

U.S. PATENT DOCUMENTS

| | | | |
|---|---|---|---|
| 3,792,785 A * | 2/1974 | Weir | B65G 1/0407 414/278 |
| 7,991,505 B2 | 8/2011 | Lert, Jr. et al. | |
| 2009/0324378 A1 * | 12/2009 | Schafer | B65G 1/1378 414/795.9 |

(Continued)

FOREIGN PATENT DOCUMENTS

| | | |
|---|---|---|
| JP | 63-242809 A | 10/1988 |
| JP | 02-048304 A | 2/1990 |
| JP | 2009-280294 A | 12/2009 |

*Primary Examiner* — Saul Rodriguez
*Assistant Examiner* — Willie Berry, Jr.
(74) *Attorney, Agent, or Firm* — Keating & Bennett, LLP

(57) ABSTRACT

In a picking system, commodities are efficiently transported to a picking area and a shipment area by one type of transportation vehicle travelling along a travelling route including a diverging section and a merging section. The picking system is provided with a transportation vehicle, racks, picking units, the shipment area, and a controller configured and programmed to control the transportation vehicle. The picking units are provided with a carrying-in station to which the transportation vehicle transports a container and a carrying-out station from which the transportation vehicle transports the container and the picked commodities. The transportation vehicle transports a container containing ordered commodities from the racks to a carrying-in station, the picked commodities to the shipment area, and a container after picking the commodities to the racks.

7 Claims, 11 Drawing Sheets

(56) References Cited

U.S. PATENT DOCUMENTS

2013/0238117 A1 9/2013 Yagawa
2014/0088748 A1 3/2014 Woodtli et al.

* cited by examiner

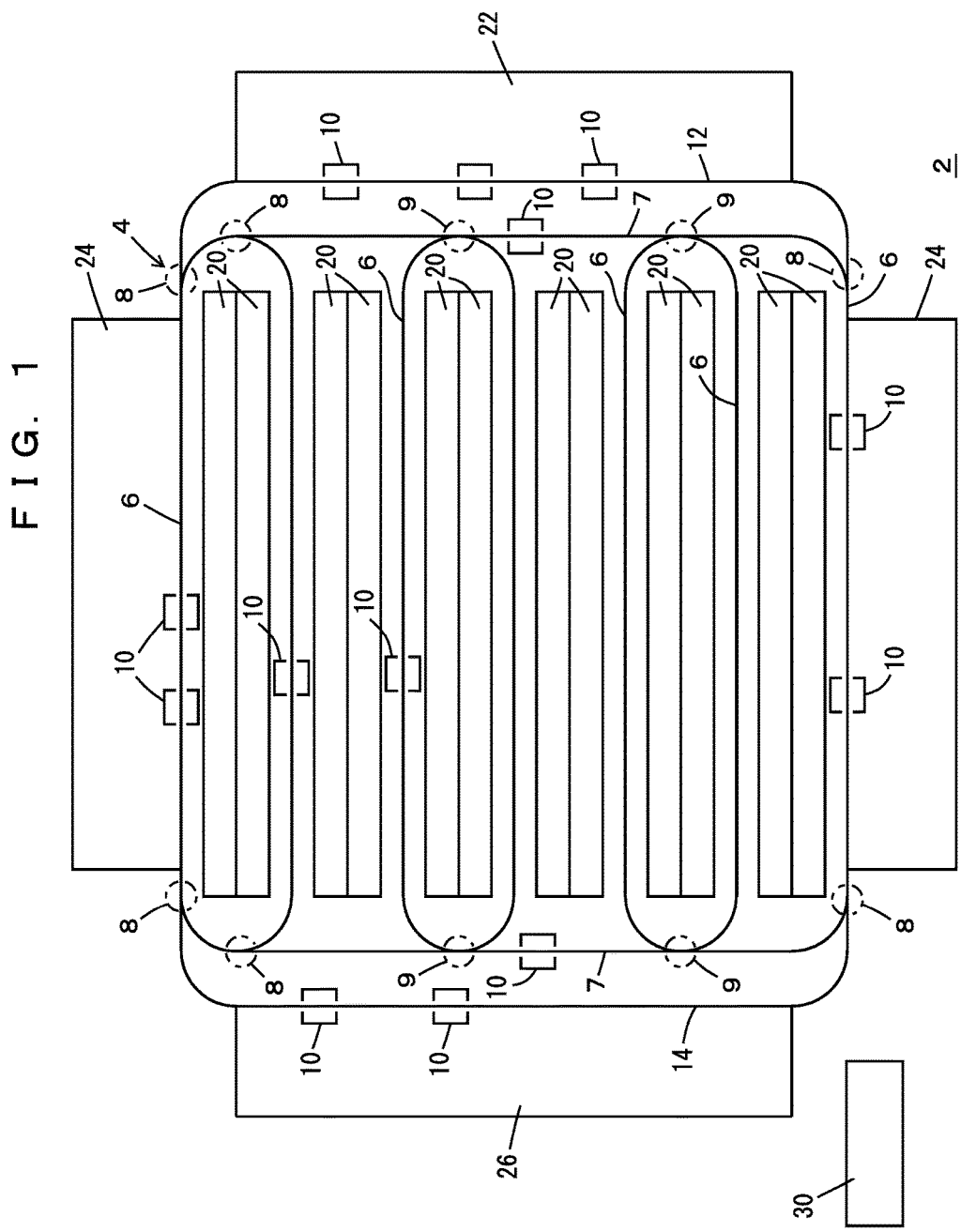

F I G. 5
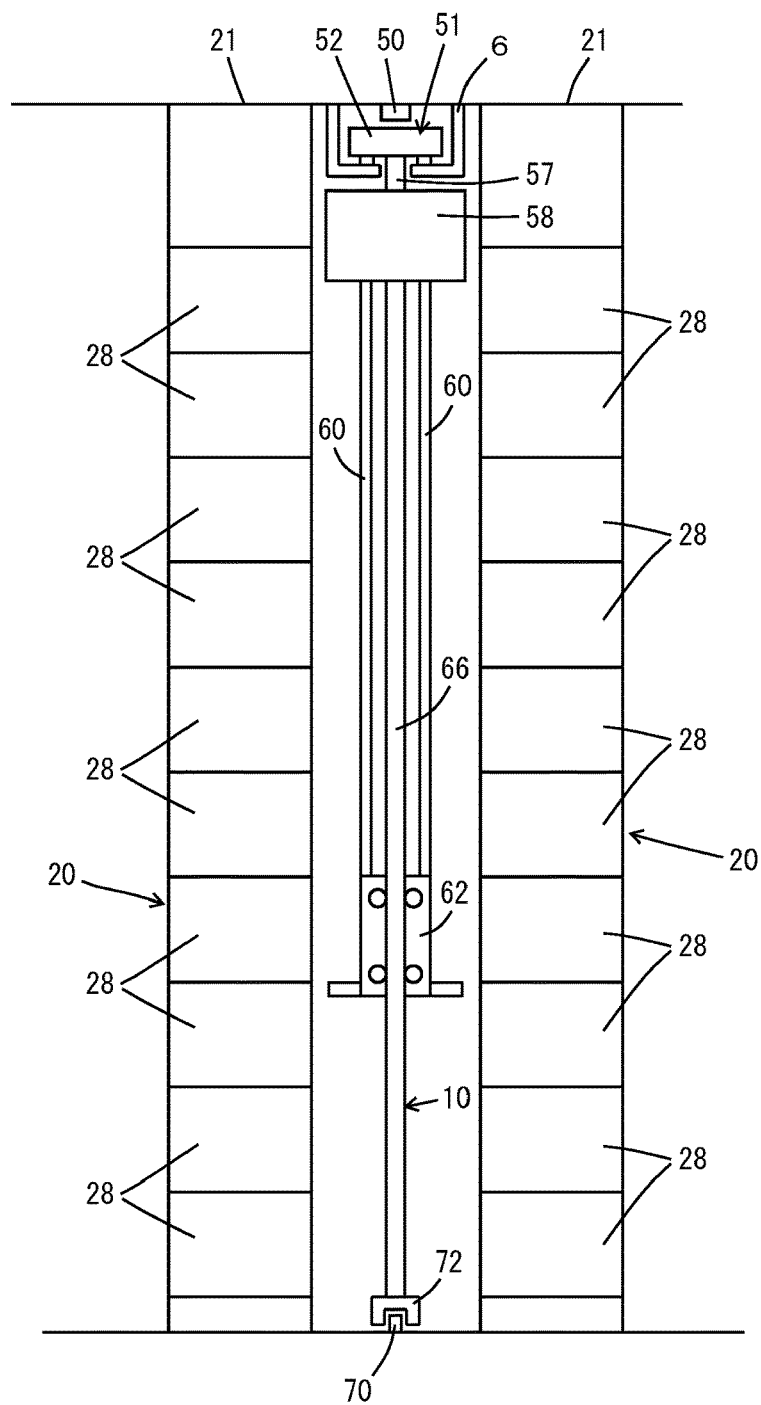

F I G. 6
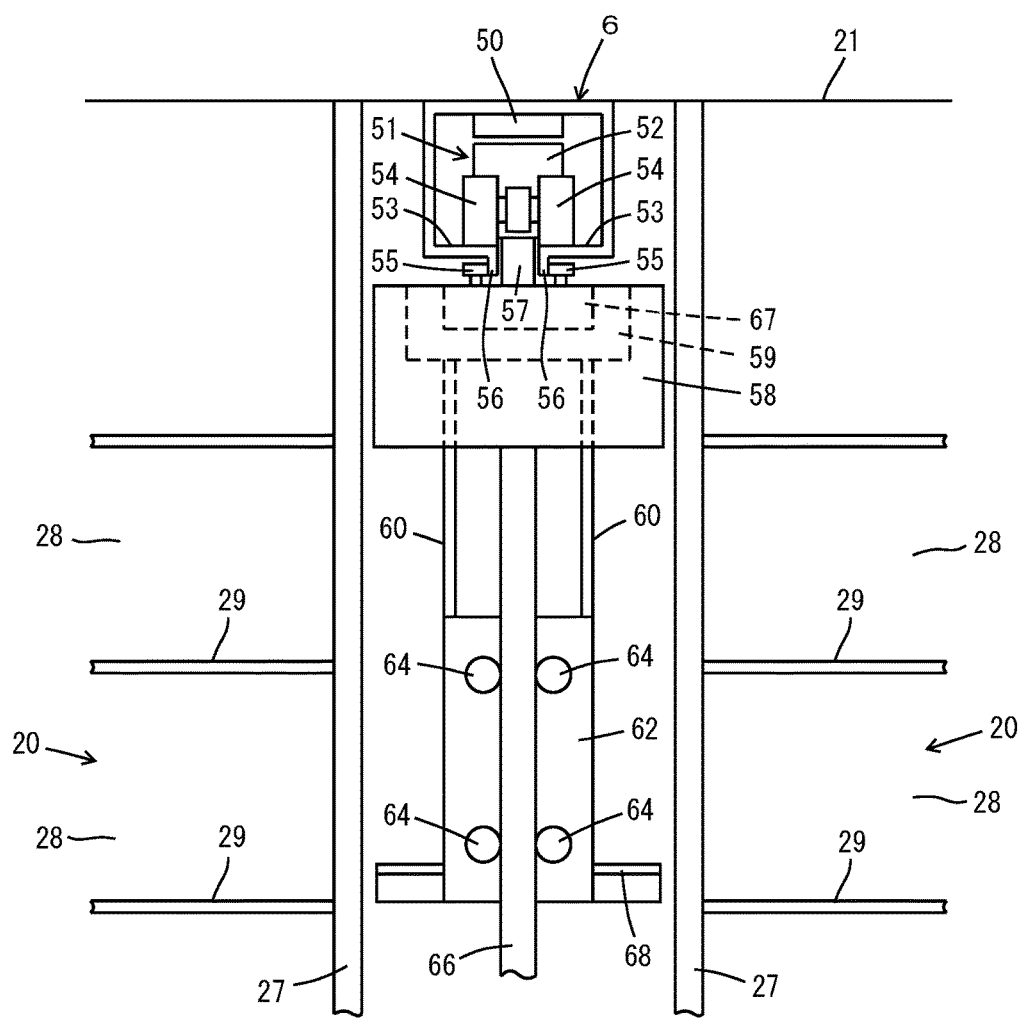

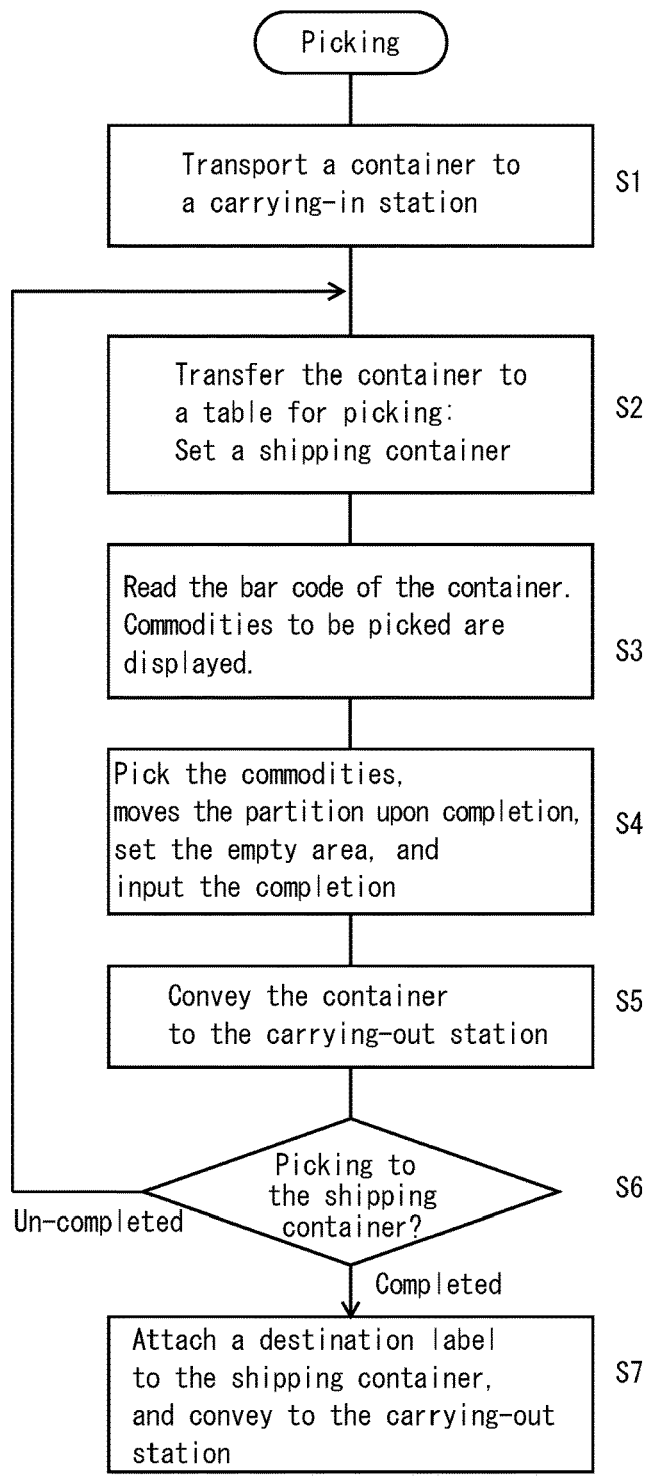
F I G. 1 2

PICKING SYSTEM AND PICKING METHOD

BACKGROUND OF THE INVENTION

1. Field of the Invention

The present invention relates to a picking system and a picking method.

2. Description of the Related Art

When picking commodities, piece by piece, from so many various types of commodities in response to requests by customers, operators walk around with a cart in a warehouse to pick the commodities from the racks in accordance with the display on a screen of the cart. In this case, the operators must walk a long distance from one rack including a commodity to another rack including another commodity.

A picking system is known, where rail-guided vehicles are combined with an automated storage and retrieval warehouse including stacker cranes and racks, and containers containing commodities are transported to a picking area by the rail-guided vehicles. Further, conveyors connecting the picking area and a shipment area are also known. In this case, since the system may deal with very many types of commodities, very many racks are needed, and thus, many lanes for the many stacker cranes and many rail-guided vehicles are required. Furthermore, because a stacker crane can only reciprocate within a single lane, a plurality of stacker cranes are needed to pick commodities for one shipping destination.

JP S63-242809A proposes transporting articles by overhead travelling vehicles between an arrival area of a factory, a plurality of racks in a component warehouse, and assembly lines. Furthermore, according to JP S63-242809A, the travelling route for the overhead travelling vehicles is provided with a diverging section and a merging section so that the overhead travelling vehicles may access the plurality of racks. However, JP S63-242809A does not consider picking.

SUMMARY OF THE INVENTION

Preferred embodiments of the present invention provide a picking system and a picking method where commodities are efficiently transported to picking units and shipment area(s) by making one type of transportation vehicle travel along a travelling route including a diverging section and a merging section.

According to a preferred embodiment of the present invention, a picking system for picking commodities from a plurality of containers stored in racks in accordance with orders includes a transportation vehicle that travels along a travelling route including a diverging section and a merging section; a plurality of racks provided along the travelling route; a plurality of picking units provided along the travelling route, including a carrying-in station to which the transportation vehicle transports a container and a carrying-out station from which the transportation vehicle transports the container and picked commodities; a shipment area provided along an outer periphery of the travelling route; and a controller configured and programmed to control the transportation vehicle to transport a container containing ordered commodities from racks to a carrying-in station, the picked commodities to the shipment area, and the container after picking the commodities to one of the racks.

According to a preferred embodiment of the present invention, a picking method uses a picking system to pick commodities from a plurality of containers stored in racks, the picking system includes a transportation vehicle that travels along a travelling route including a diverging section and a merging section; a plurality of racks provided along the travelling route; a plurality of picking units provided along the travelling route, including a carrying-in station to which the transportation vehicle transports a container and a carrying-out station from which the transportation vehicle transports the container and picked commodities; a shipment area provided along an outer periphery of the travelling route; and a controller configured and programmed to control the transportation vehicle, and the picking method includes: transporting a container containing ordered commodities from the racks to a carrying-in station by the transportation vehicle under the control of the controller; picking the ordered commodities from the container at the picking unit; and transporting the picked commodities to the shipment area and the container after picking the commodities to one of the racks by the transportation vehicle under the control of the controller.

According to various preferred embodiments of the present invention, for example, a plurality of transportation vehicles travel and transport containers from the racks to the carrying-in stations of the picking units. The carrying-in stations also define and function as container buffers, and operators or the like pick the commodities at the picking units, and after the picking, the containers and the picked commodities are transported from the carrying-out station by the transportation vehicles. Accordingly, the containers are transported to and from the position near the operators by the transportation vehicles, and the operators may devote themselves to picking from the containers and are not required to move to the racks storing the commodities.

Because the transportation vehicles travel along the travelling route including at least a diverging section and at least a merging section, the transportation vehicles may access racks which are distributed in a wide area, and may transport commodities from the racks to the picking units and from the picking units to the shipment area and the racks. Accordingly, only one type of transportation vehicles is needed, and multiple types of transportation devices such as stacker cranes, rail-guided vehicles, vertical conveyors, and long-distance conveyors are not necessary. The shipment area that is provided along the outer periphery of the travelling route allows easy shipment to trucks and so on and is preferably provided on the ground floor.

In this specification, picking indicates taking out at least a commodity from stocked commodities and shipping the taken-out commodity, and descriptions regarding the picking system are applicable to the picking method. Furthermore, picking area includes an area including a plurality of picking units and may be provided along the outer periphery of the travelling route and also along the inner periphery of the travelling route. Furthermore, the front and rear refer to the front and rear in the travelling direction of the transportation vehicle, and the left and right indicate the left and right whose center is the travelling direction of the transportation vehicles and they are at the both sides of the center.

Preferably, an arrival area is further provided along the outer periphery of the travelling route, and the controller is further configured and programmed to control the transportation vehicle to transport containers from the arrival area to the racks. The additional arrival area releases the picking units from the concentration of the commodities, in comparison with a system where arrived commodities are treated in picking units. The arrival area provided along the outer periphery of the travelling route allows easy reception of arrived commodities from trucks and so on, and the arrival area is preferably provided on the ground floor.

Preferably, the controller is further configured and programmed to store an amount of an empty area in each of the containers, and the picking units are provided with an input interface to input the amount of empty area after picking. Since the amount of empty area after picking is inputted, the amount of the empty area is correctly managed. Further, the management of the empty area enables the management of the amount of commodities which may be added to a particular container easily.

Particularly preferably, the containers are provided with a movable partition between the empty area and another area which contains commodities in the containers, and the input interface to input the amount of empty area receives an input of a position of the movable partition, for example by five level buttons, as the input of the amount of empty area. With this configuration, the amount of the empty area may be quickly and correctly inputted, and the partition in a container allows easier picking of commodities than a container without the partition where commodities are distributed in the whole container.

Preferably, the travelling route includes rails provided in a ceiling space of a building of the picking system. The transportation vehicle includes a carriage travelling along the rails and including a hoist to drive a suspension member, a mast attached to the carriage in a vertically downward direction, and an elevation platform guided by the mast, raised and lowered by the suspension member, and including a transfer device. Instead of a stacker crane travelling on the ground, a mast is suspended from a carriage which travels in a ceiling space, and a light weight transportation apparatus is resultant, since the carriage is only required to support the vertical weight from the mast. The elevation platform is guided by the mast, is reduced in vibration, and transfer devices such as a slide fork may be provided.

Particularly preferably, the elevation platform is provided with a plurality of vertically arranged plates, each including the transfer device and being capable of supporting a container. It allows to transport plural containers together, in particular, the plural containers may be transported to one picking unit together. The vertically stacked plates make the length of the transportation vehicle short and make the diversion and merging easier.

Preferably, along a travelling direction of the transportation vehicle, the elevation platform includes plural and parallel carrying-in conveyors to receive the picked commodities from the picking units, in a central portion of the elevation platform, and includes a transfer device to transfer a container to the carrying-in station and a transfer device to receive a container from the carrying-out station, in front of and at a back of the carrying-in conveyors, the picking units further include: a table provided with a container-conveying conveyor to transfer a container from the carrying-in station; plural and parallel carrying-out conveyors to transfer the picked commodities to the carrying-in conveyors and provided in the table and beside the travelling route; and a placement space for a container connected to the exit of the container-conveying conveyor, and the carrying-out station includes the carrying-out conveyors and the placement space.

According to this preferred embodiment of the present invention, the container is transferred from the elevation platform to the carrying-in station, and commodities are picked onto the carrying-out conveyors for respective destinations on the table of the picking unit. Then, the commodities are transferred from the carrying-out conveyors to the carrying-in conveyors of the elevation platform, and the container is transferred from the picking unit to the transfer device on the elevation platform. Thus, commodities are picked and delivered to plural destinations easily.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a plan view illustrating a layout of a picking system according to a preferred embodiment of the present invention.

FIG. 5 is a front view illustrating an overhead travelling vehicle and left and right racks according to a preferred embodiment of the present invention.

FIG. 6 is an enlarged partial front view of FIG. 5.

FIG. 12 is a flowchart illustrating a picking algorithm according to a preferred embodiment of the present invention.

DETAILED DESCRIPTION OF THE PREFERRED EMBODIMENTS

Figure 2:
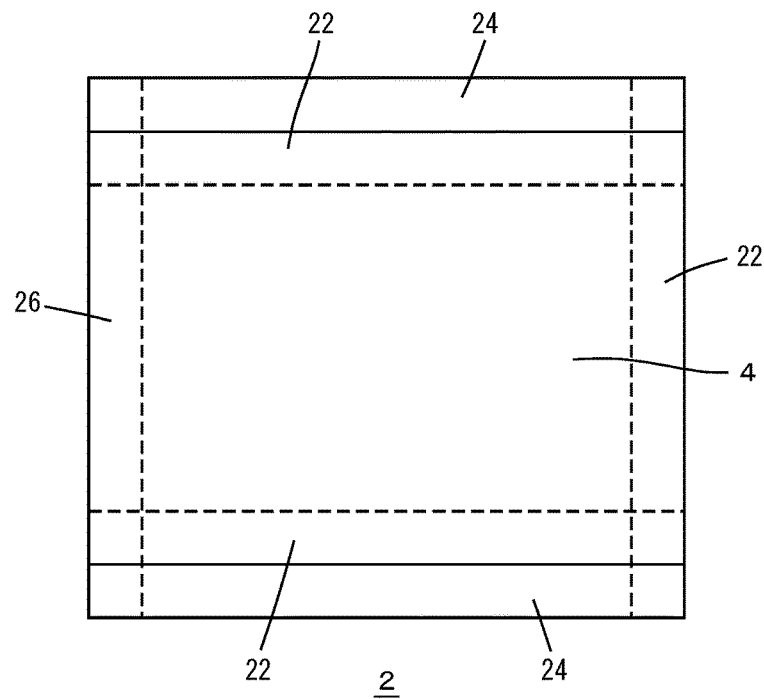
FIG. 2 is a plan view illustrating an arrangement, according to a preferred embodiment of the present invention, of an automated storage and its peripheral devices including a retrieval warehouse; picking areas; an arrival area; and shipment areas.

Hereinafter, preferred embodiments of the present invention will be described. The scope of the present invention is based on the claims and is to be determined in accordance with the understanding of a person skilled in the art with reference to the description and well-known techniques in the field of the present invention.

FIGS. 1 to 13 show a picking system 2 according to preferred embodiments and modifications thereof. FIG. 1 shows the layout of the picking system 2; an automated storage and retrieval warehouse 4 is provided with ceiling rails 6 on the ceiling space thereof, and the rails include a plurality of diverging/merging sections 8 and 9. On the rails, overhead travelling vehicles 10 travel. Although the ceiling rails (hereinafter, referred to as "rails") 6 may allow the overhead travelling vehicles 10 to travel bi-directionally, the overhead travelling vehicles 10 preferably travel only unidirectionally in the present preferred embodiment. The diverging/merging sections 8 are zones in which the rail 6 diverges and merges, and the overhead travelling vehicles 10 may control by themselves to diverge or travel straight ahead (in a case of diverging), or to travel straight ahead or merge (in a case of merging). The structure of the rails 6 in the diverging/merging sections 8 are the same as an already known overhead travelling vehicle system, for example. Note that diverging/merging sections 9 include two diverging/merging sections in series with a short gap therebetween. A plurality of racks 20 are provided along the rails 6, and bypass lanes 7 denoted by 7 may not be provided and may be used as retracting lanes described later. A lane 12 connecting a picking area 22 and a lane 14 connecting an arrival area 26 are provided. If no bypass lane 7 is provided, the rails 6 provided along the racks 20 are connected to the lanes 12 and 14 by the diverging/merging sections 9.

The picking area 22, shipment areas 24, and the arrival area 26 are provided, for example, on the four sides of the automated storage and retrieval warehouse 4. Of these, the shipment areas 24 and the arrival area 26 are provided along the outermost periphery of the travelling rails 6, for example, on the ground floor so as to make entrance and exit of trucks and the like easy, and the picking area 22 is provided, for example, in a plurality of layers. The controller 30 of the picking system 2 may include one computer or a plurality of computers that are arranged in a distributed manner, for example.

Figure 3:
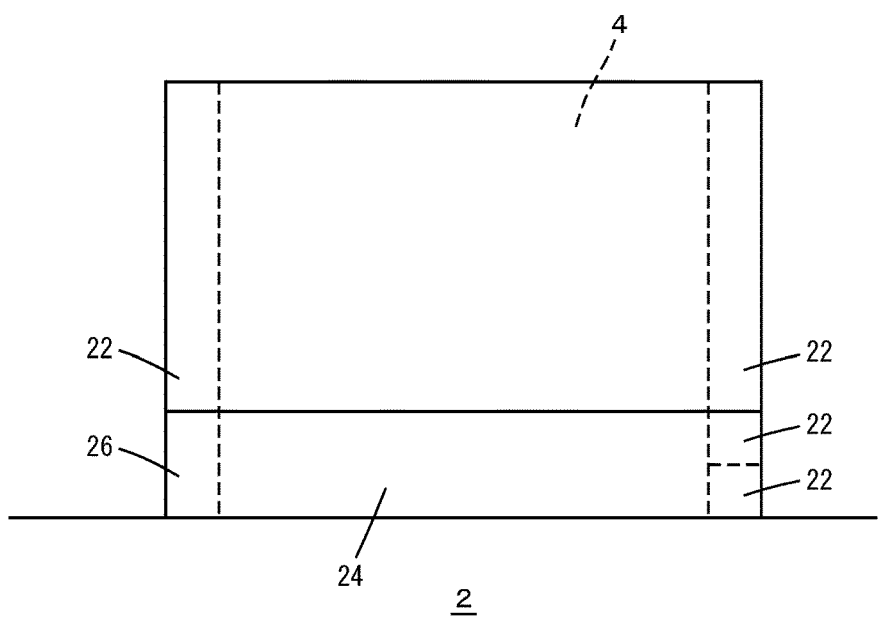
FIG. 3 is a side view illustrating a picking system according to a preferred embodiment of the present invention.

FIGS. 2 and 3 show an arrangement of the automated storage and retrieval warehouse 4, and the picking areas 22, the shipment areas 24, and the arrival area 26 in the periphery. Most transfer destinations for the overhead travelling vehicles 10 are the picking areas 22, followed by the shipment areas 24. Since the picking system 2 handles small volumes but various types of commodities, commodities transferred into the arrival area 26 is the smallest in the volume. Accordingly, the floor spaces of the areas 22, 24, and 26 are determined based on the volume of commodities to be transported by the overhead travelling vehicles 10, the amount of operations to be performed in the areas 22, 24, and 26, and the like.

Figure 4:
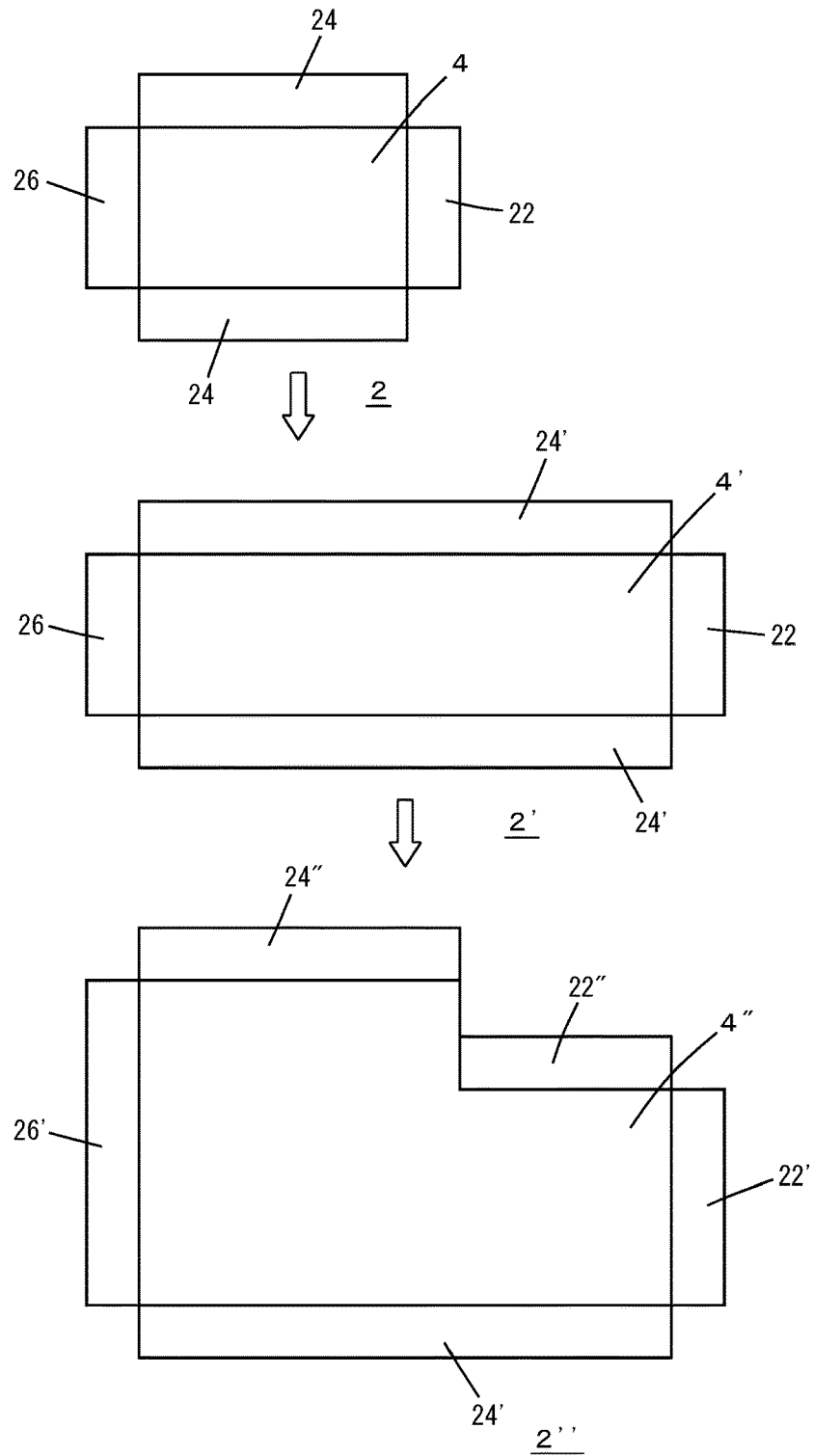
FIG. 4 illustrates schematically the expansion of a picking system according to a preferred embodiment of the present invention.

The picking system 2 may be expanded sequentially, and this situation is shown in FIG. 4. In FIG. 4, the sign ' indicates an element after expansion, and in the reference numerals 22, and 22', for example, the reference numeric 22 indicates the same element. For example, the original picking system 2 in the upper stage of FIG. 4 is expanded into a picking system 2' in the middle stage. Here, the picking area 22 and the lane 12 of FIG. 1 may or may not be removed, and with expanding the rails 6, the racks 20, and the like, an automated storage and retrieval warehouse 4' is obtained. With a further expansion, an automated storage and retrieval warehouse 4" shown in the lower stage of FIG. 4 is obtained. In the present preferred embodiment, the layout is flexible, and the expansion is also easy.

FIGS. 5 and 6 show the structure of the overhead travelling vehicle (hereinafter, referred to as GS. 4, the sign ' indicates an rails 6 are fixed to a ceiling 21 of a building of the racks 20 standing by themselves, and permanent magnets 50 are arranged in the rails 6 in the travelling direction of the travelling vehicles 10. The travelling vehicle 10 is provided with a plurality of travelling units 51 and is powered by a non-contact charging device not shown, or the like. Coils 52 of the travelling units 51 and the permanent magnets 50 in the rails 6 define a linear motor.

The tread surfaces 56 of the rails 6 support wheels 54. The travelling unit 51 is provided with guide rollers 55 and is guided by guide rails 56 provided on the rails 6. The plurality of travelling units 51 support a chassis 58 via rotatable shafts 57. A switching unit 67 provided on the chassis 58 or the travelling unit 51 moves the guide rollers 55 vertically or laterally to switch the contact between the guide rollers 55 and the guide rails 56 on/off. Accordingly, the travelling vehicle 10 controls whether to diverge or travel straight ahead. The chassis 58 and the travelling units 51 define a carriage of the overhead travelling vehicle 10. A hoist 59 of the chassis 58 drives suspension members 60 such as chains to raise and lower an elevation platform 62 along masts 66, and the counter weight of the elevation platform 62 is accommodated, for example, in the masts 66. The racks 20 are supported by pillars 27 and include cells 28 provided with article supports 29.

At least a mast, for example, a pair of front and rear masts 66 are suspended from the chassis 58 by pins so as to be capable of being inclined in the travelling direction. The masts 66 guide rollers 64 so as to restrict vibrations and twists, or the like of the elevation platform 62, and the elevation platform 62 includes one or more transfer devices 68 such as slide forks. The lower ends of the pair of front and rear masts 66 are coupled to each other, for example, by a flat connection member 72, and the connection member 72 is provided with guide rollers not shown and is guided by a guide rails 70 provided on the ground section of the building. The masts 66 are allowed to rock in the travelling direction, and the travelling units 51 is controlled not to accelerate or decelerate in the vicinity of its natural frequency to prevent the vibration of travelling units 51. A unshown damper, an unshown anti-vibrational rubber, or the like, preferably is provided on a connecting portion between the masts 66 and the chassis 58 so as to reduce vibrations during an emergency stop. Note that the front and rear masts 66 are not necessarily coupled, and the guide rails 70 or the like may not be provided in the lower portion. Alternatively, travelling wheels may be provided on the connection member 72 to support a portion of the weight of the masts 66. The number, the structure, or the like of masts 66 are arbitrary.

Figure 7:
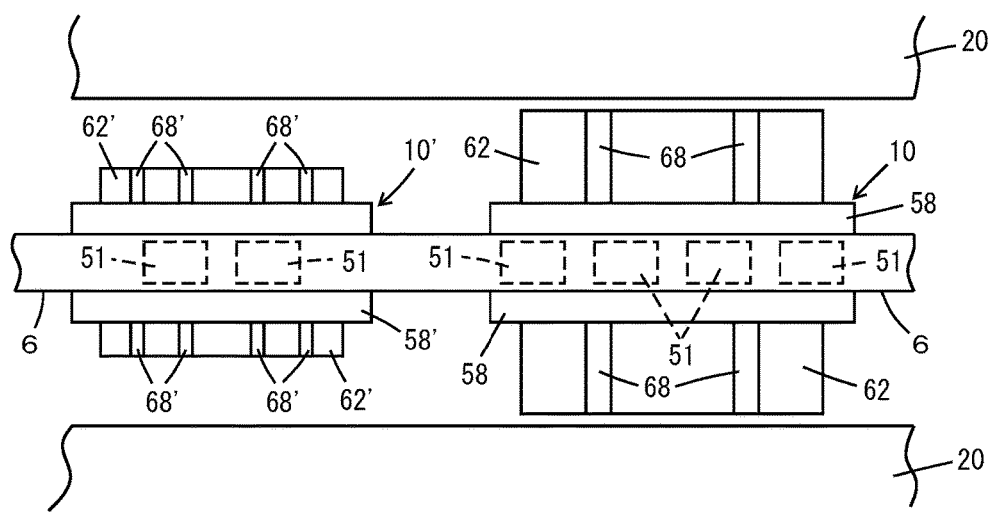
FIG. 7 is a plan view illustrating two types of overhead travelling vehicles travelling along common rails according to a preferred embodiment of the present invention.

The picking system 2 may handle containers of various sizes, such as commodity storage containers, shipping containers, containers for large-size commodities, and containers for small-size commodities. As a solution to this problem, plural types of travelling vehicles 10 and 10' including different sizes may travel along the common rails 6. This situation is shown in FIG. 7. The travelling vehicle 10 is preferably provided with the large chassis 58 with four travelling units 51, for example, the large elevation platform 62, and the large transfer device 68, and the travelling vehicle 10' preferably is provided with a small chassis 58' with two travelling units 51, for example, a small elevation platform 62', and a small transfer device 68'. In FIG. 7, the depth of the elevation platform 62' (width in a lateral and perpendicular direction to the rails 6) is smaller than the depth of the elevation platform 62, but the elevation platforms 62 and 62' may have the same depth. Since the travelling vehicles 10 and 10' of different sizes travels along the same rails 6, containers of different sizes are efficiently transported, and the travelling vehicles 10 and 10' may move in a wider range.

Figure 8:
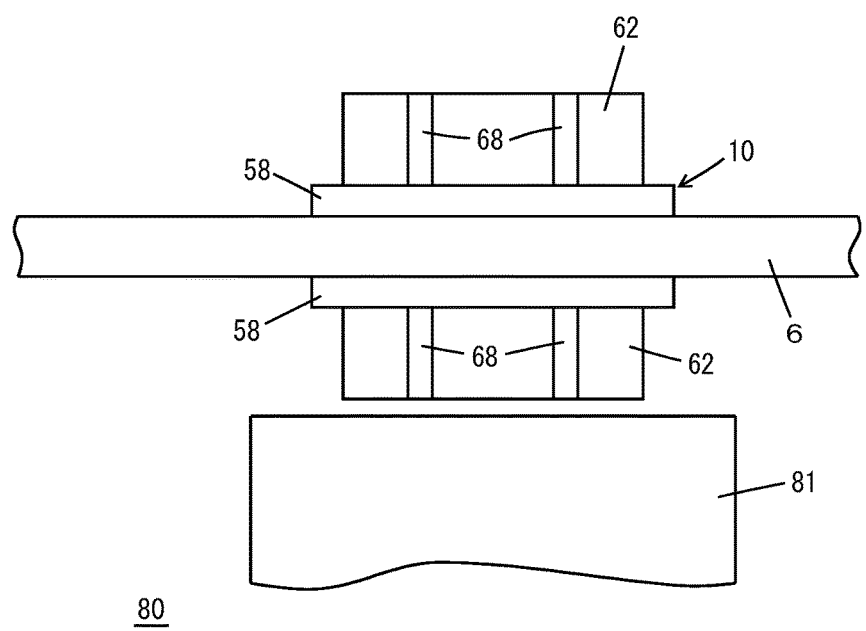
FIG. 8 is a plan view illustrating a retracting lane for the overhead travelling vehicle and a maintenance deck according to a preferred embodiment of the present invention.

All the travelling vehicles 10 are not required to operate at all times. As shown in FIG. 8, the bypass lanes 7 of FIG. 1 and the like may be used as retracting lanes 80, and the travelling vehicles 10 that are not operated may be made retracted therein in order to reduce power consumption. Furthermore, providing a maintenance deck 81 in the retracting lanes 80 makes the maintenance of the elevation platform 62, the chassis 58, and the like easier.

Figure 9:
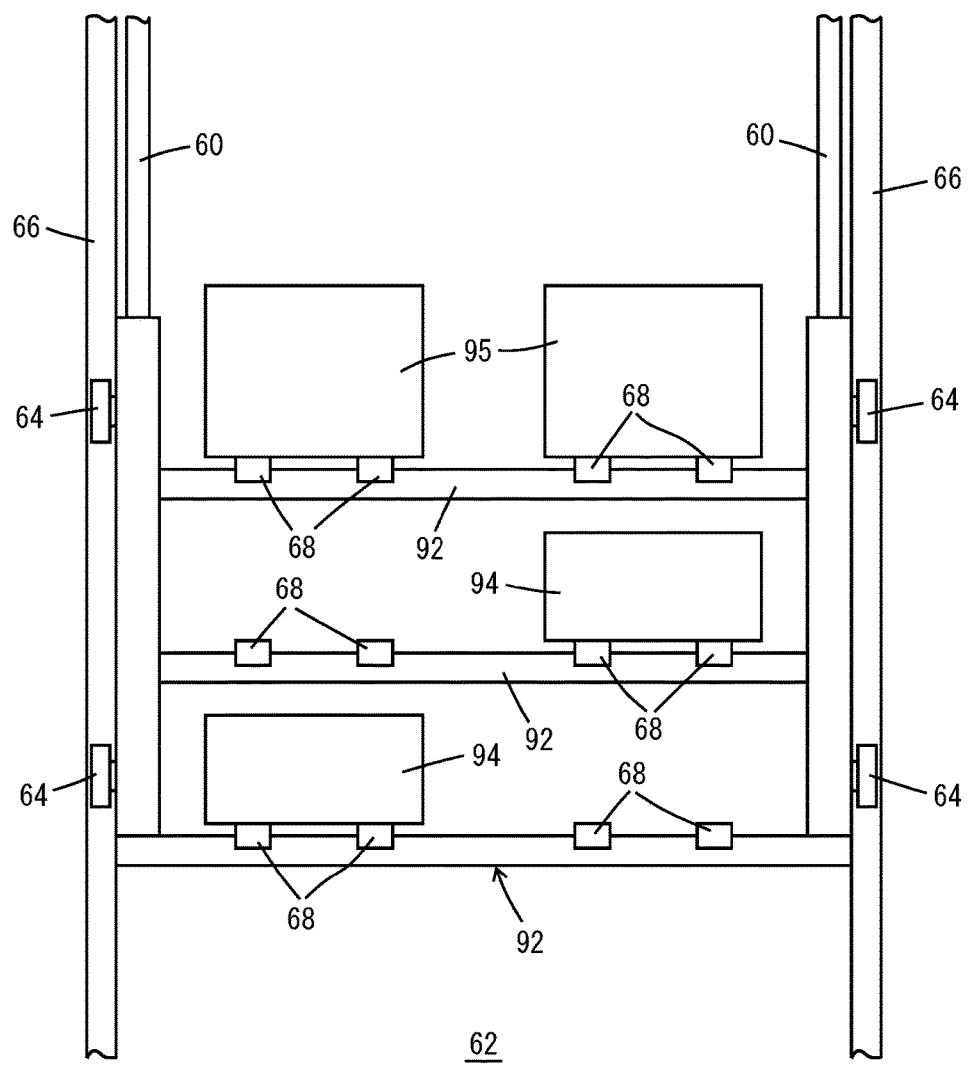
FIG. 9 is a diagram illustrating an elevation platform of an overhead travelling vehicle according to a preferred embodiment of the present invention.

In the picking system 2, lightweight containers are often transported. Accordingly, as shown in FIG. 9 for example, preferably, a plurality of plates 92 are stacked on the elevation platform 62, and transfer devices 68 are provided on respective plates 92 so as to transport a large number of containers 94 and 95 at the same time. Note that, a plurality of similar plates may be stacked also on the small elevation platform 62' of FIG. 7. Of course, a conventional elevation platform of only one layer (only one plate 92) may be used.

Figure 10:
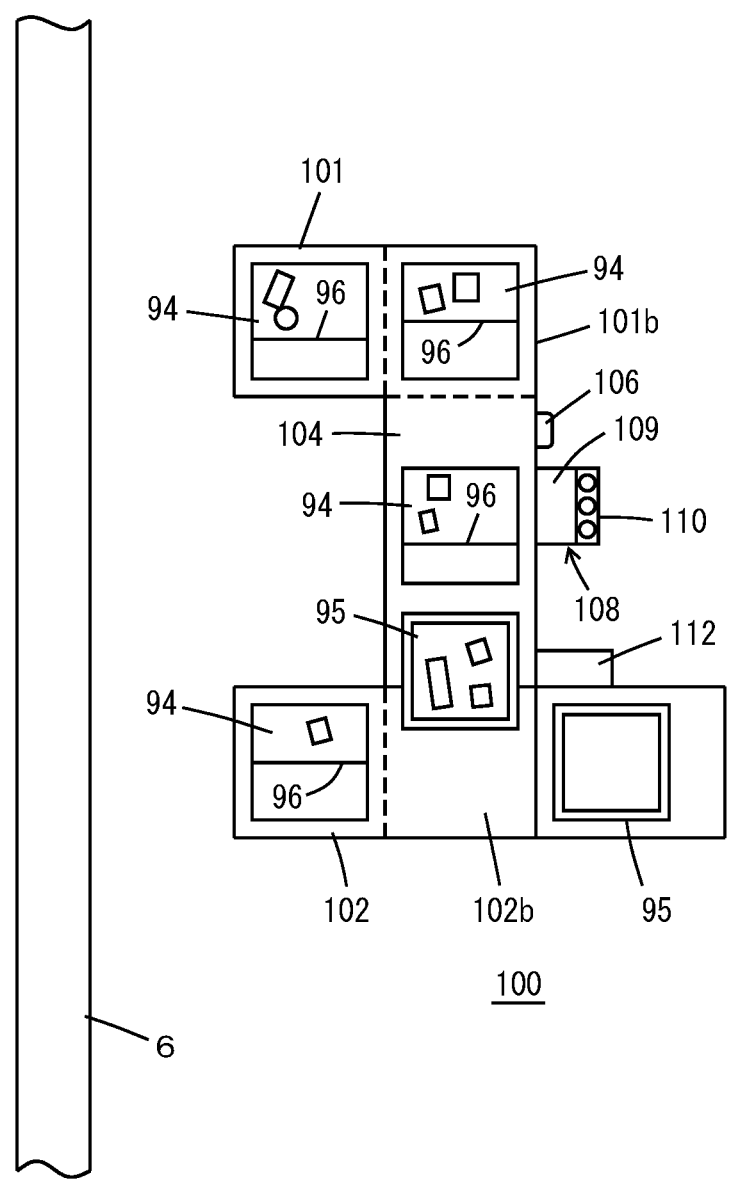
FIG. 10 is a plan view illustrating a picking unit including a carrying-in station, a carrying-out station, and a table according to a preferred embodiment of the present invention.

FIG. 10 shows a picking unit 100, and a plurality of picking units 100 define the picking area 22 of FIG. 1 or the like. The containers 94 containing commodities are transported into the carrying-in station 101 near to the rails 6 by the travelling vehicle and are conveyed by an un-shown conveyor to a picking table 104 via a buffer 101b. The table 104 is provided with an ID reader such as a bar code reader 106, a terminal 108, and a label printer 112, and an operator picks commodities from the containers 94 and loads the picked commodities into a shipping container 95 such as a cardboard box, in accordance with instructions displayed on a display 109 of the terminal 108. The terminal 108 and the label printer 112 may be integrated, and the commodities may be picked from a plurality of containers 94 to one shipping container 95, or from one container 94 to a plurality of shipping containers 95.

After the picking, the operator moves a partition 96 in the container 94 in accordance with an empty area (the amount of an empty space in the container 94), and inputs through an input interface 110 the completion of the picking and the empty area of the container 94. For example, the input interface 110 may include a plurality of buttons indicating the positions of the partition 96, and the operator may input the empty area by selecting and pressing one of the buttons. Then, the operator takes out a label showing a shipping destination address from the label printer 112 and attaches the label to the shipping container 95. The container 94 after the picking and the shipping container 95 are conveyed by an unshown conveyor to a carrying-out station 102 via a buffer 102b, and the travelling vehicle transports the container 94 to the rack 20 and the shipping container 95 to the shipment area 24.

Figure 11:
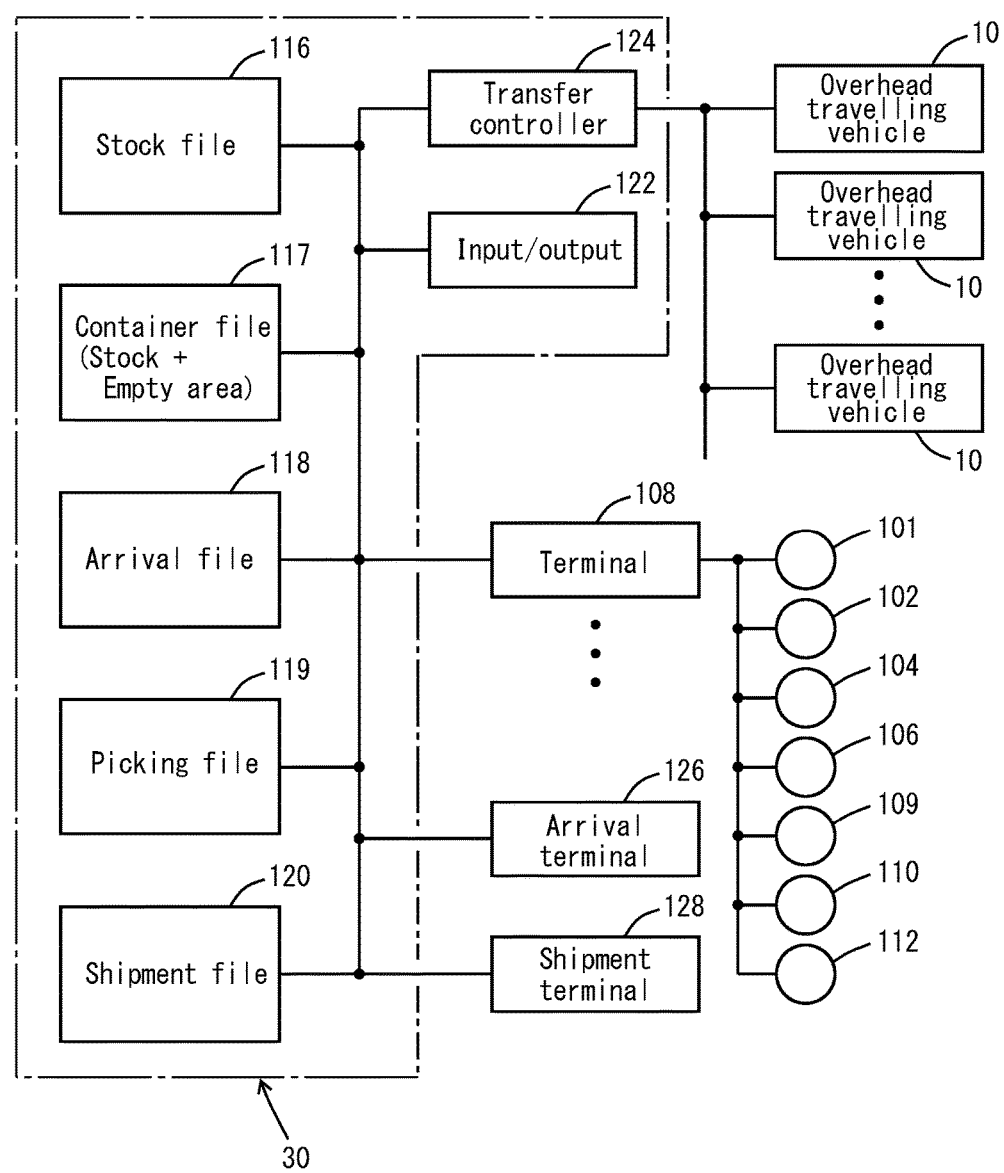
FIG. 11 is a block diagram illustrating a control system according to a preferred embodiment of the present invention.

FIG. 11 shows the control system of the picking system 2. The controller 30 stores the following files in memories 116 to 120. A stock file stores the stock of the picking system 2, and a container file stores a list of an ID, a position, and contained commodities, and an empty area of each container 94. An arrival file stores a list of arrived commodities, and a shipment file stores a list of shipped commodities. A picking file stores, for each order, a list of commodities to be shipped, assignments of the commodities to the containers 94, shipping destinations, and the progress of picking. An input/output interface 122 is also preferably provided.

A transfer controller 124 in the controller 30 assigns transportation commands for a plurality of overhead travelling vehicles 10 and controls the transportation of the containers 94 and 95. Although one overhead travelling vehicle 10 may transport a plurality of containers 94 at a time, it is preferable to transport the plurality of containers 94 all at once to the picking units. The controller 30 communicates with the terminal 108 of the picking unit, associates commodities to be picked up with IDs such as bar codes of the containers 94, causes to display them, and transmits the shipping destination address. The controller 30 also updates, upon input via the input interface 110, the container file and the picking file. An arrival terminal 126 is provided in the arrival area and creates a list of arrived commodities, and the controller 30 updates the arrival file based on the list. A shipment terminal 128 is provided in the shipment area and creates a list of commodities shipped and shipping destinations, and the controller 30 updates the shipment file based on the list.

FIG. 12 shows an algorithm to perform the picking process. In step S1, the container 94 is transported by the travelling vehicle 10 from the rack 20 to the carrying-in station 101 and waits for its turn for the picking in the buffer 101b. When the turn comes, the operator moves the container 94 from the buffer 101b to the table 104 using the conveyor and sets the shipping container 95 on the table 104 (step S2). Then, the ID (bar code) of the container 94 is read by the operator and is transmitted to the controller 30. Then, the list of commodities to be picked is returned and is shown on the display 109 (step S3). The operator picks commodities from the container 94 to move them into the shipping container 95 in accordance with the display 109, moves the partition 96 upon completion, sets the empty area through the input interface 110, and inputs the completion of that picking (step S4).

When the completion of the picking is inputted, the container 94 is conveyed to the carrying-out station 102 via the buffer 102b (step S5). If picking to the shipping container 95 is complete, namely if there are no further commodities to be picked and packed from another container 94, a label showing the shipping destination is attached to the shipping container 95, and the shipping container 95 is conveyed to the carrying-out station 102 via the buffer 102b (steps S6 and S7). The containers 94 and 95 are transported by the travelling vehicle 10 to the travel destinations such as the shipment area 24 and the rack 20.

Figure 13:
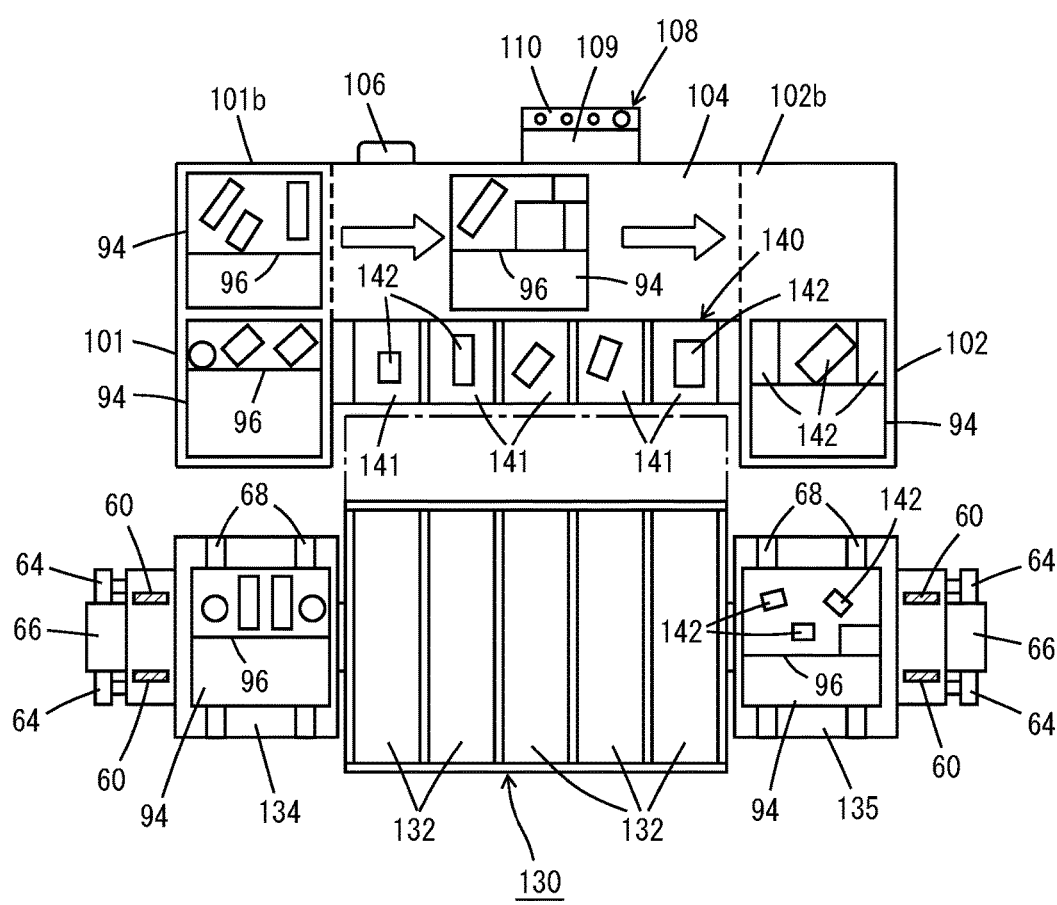
FIG. 13 is a plan view illustrating an elevation platform of an overhead travelling vehicle and a picking unit according to a modification of a preferred embodiment of the present invention.

FIG. 13 shows a modification of the picking unit and a modification of the elevation platform of the overhead travelling vehicle. Reference numerals already shown in FIG. 10 denote the same components, and the modification is the same as the above-described preferred embodiment of the present invention except for the following points. The elevation platform is provided with conveyor plates 130 in which carrying-in conveyors 132 are arranged in parallel or substantially in parallel and plates 134 and 135 respectively provided with the transfer device 68, and respective plates are arranged in a plurality of layers, for example. Preferably, the conveyor plates 130 are moved between a retracted position indicated by a solid line in the figure and an advanced position indicated by a dotted line by an unshown advancing and retracting device. The picking table 104 is provided with a container-conveying conveyor to convey the containers 94 from the carrying-in station 101 to the carrying-out station 102 (placement space). Furthermore, the table 104 is provided beside the travelling route for the overhead travelling vehicle runs with a carrying-out plate 140 including parallelly arranged plural carrying-out conveyors 141. Denoted by 142 are individual commodities, and the layer number of the plates 134, 135, and 130 may be one, or the layer number of the plates 134 and 135 may differ from that of the plate 130. Furthermore, the allocation of the pair of front and rear transfer devices 68 to carrying-in and carrying-out is arbitrary.

The containers 94 are conveyed to the table 104 via the carrying-in station 101 and the buffer 101b, and the operator places the commodities 142 on the carrying-out conveyors 141 in the carrying-out plate 140. Here, if a carrying-out conveyor 141 is classified for each shipping destination, it is possible to perform picking for a plurality of shipping destinations at the same time. After the picking is complete, the conveyor plate 130 is advanced to a position indicated by the dotted line of FIG. 13, and the commodities 142 are transferred from the carrying-out conveyors 141 to the carrying-in conveyors 132. Then, the containers 94 for which the picking is completed is transferred to the plate 135, the conveyor plate 130 retracts, and the containers 94 are conveyed. In FIG. 13, the carrying-out station 102 and the carrying-out plate 140 correspond to a carrying-out station in the claims. Furthermore, it is also possible to use a carrying-out plate 140 not including the carrying-out conveyors 141, in this case, an operator may manually transfer commodities to the carrying-in conveyors 132. The overhead travelling vehicle may or may not wait during the picking. Then, in the shipment area 24, commodities are loaded into the container for each shipping destination by the carrying-in conveyors 132.

A preferred embodiment of the present invention preferably includes the following features:
1) The overhead travelling vehicle 10 supports only the vertical loads applied to the masts 66 and thus is more lightweight than conventional stacker cranes.
2) Due to the use of the linear motor, no force in the travelling direction is applied to the rails 6. Therefore, a lightweight rails 6 may be used.
3) All transportations are performed by the overhead travelling vehicles 10 except those for the conveyors of the picking unit 100 and the like.
4) The overhead travelling vehicle 10 may enter all areas in the automated storage and retrieval warehouse 4 and transport efficiently.
5) The retracting lane 80 reduces the power consumption, and the maintenance deck 81 makes the maintenance of the overhead travelling vehicle 10 easier.
6) The picking system 2 is easily expandable.
7) Plural types of overhead travelling vehicles 10 and 10' may travel on the common rails 6 and they use the common travelling units 51.
8) The multiple layered plates 92 on the elevation platform 62 of the overhead travelling vehicle 10 makes the transportation more efficient and does not increase the length of the carriage so that the diverging and merging are made easy. Particularly, the containers used to perform picking are carried together into the picking unit 100 and may be placed on the buffer 101b and the like. Furthermore, the containers 94 and the like after picking may be carried out together from the carrying-out station 102.
9) The picking unit and the elevation platform of FIG. 13 allow picking for plural shipping destinations at the same time.
10) The labor-intensive conventional picking by means of carts and operators is changed into an efficient one, and a complex picking system provided with plural types of transport devices and picking devices in combination is changed into the simple and efficient system.

According to preferred embodiments of the present invention, operators preferably perform picking, but if possible, robots may pick the commodities in place of the operators. Furthermore, the overhead travelling vehicle 10 is described as the travelling vehicle, but other travelling vehicles may be used. In the preferred embodiments of the present invention, the picking area 22 preferably is provided along the outer periphery of the travelling route for the overhead travelling vehicle 10, but it may be provided on the inner circumference of the route.

Commodities of a plurality of shipping containers 95 may be put together to one order of commodities, and in this case, it is not necessary to attach labels onto the containers 95.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A picking system for picking commodities from a plurality of containers stored in racks in accordance with orders, the picking system comprising:
   a transportation vehicle that travels along a travelling route including a diverging section and a merging section;
   a plurality of racks provided along the travelling route;
   a plurality of picking units provided along the travelling route, including a carrying-in station to which the transportation vehicle transports a container and a carrying-out station from which the transportation vehicle transports the container and picked commodities;
   a shipment area provided along an outer periphery of the travelling route; and
   a controller configured and programmed to control the transportation vehicle to transport a container containing ordered commodities from racks to the carrying-in station, the picked commodities to the shipment area, and the container after picking the commodities to one of the racks; wherein
   the travelling route includes rails provided in a ceiling space of a building containing the picking system; and
   the transportation vehicle includes a carriage travelling along the rails and including a hoist to drive a suspension member, a mast attached to the carriage in a vertically downward direction, and an elevation platform guided by the mast, raised and lowered by the suspension member, and including a transfer device.

2. The picking system according to claim 1, further comprising an arrival area provided along the outer periphery of the travelling route, wherein the controller is further configured and programmed to control the transportation vehicle to transport containers from the arrival area to the racks.

3. The picking system according to claim 1, wherein the controller is further configured and programmed to store an amount of an empty area in each of the containers, and the picking units are provided with an input interface to input the amount of empty area after picking.

4. The picking system according to claim 3, wherein the containers are provided with a movable partition between the empty area and another area which contains commodities in the containers, and the input interface to input the amount of empty area receives an input of a position of the movable partition as the input of the amount of empty area.

5. The picking system according to claim 1, wherein the elevation platform is provided with a plurality of vertically arranged plates, each including the transfer device and being capable of supporting a container.

6. The picking system according to claim 1, wherein, along a travelling direction of the transportation vehicle, the elevation platform includes parallel carrying-in conveyors that receive the picked commodities from the picking units, in a central portion of the elevation platform, and includes a transfer device that transfers a container to the carrying-in station and a transfer device that receives a container from the carrying-out station, in front of and at a back of the carrying-in conveyors, wherein
the picking units include:
a table provided with a container-conveying conveyor that transfers a container from the carrying-in station;
parallel carrying-out conveyors that transfer the picked commodities to the carrying-in conveyors and are provided in the table and beside the travelling route; and
a placement space for a container connected to an exit of the container-conveying conveyor; wherein
the carrying-out station includes the carrying-out conveyors and the placement space.

7. A picking method that uses a picking system to pick commodities from a plurality of containers stored in racks, the picking system including a transportation vehicle that travels along a travelling route including a diverging section and a merging section, a plurality of racks provided along the travelling route, a plurality of picking units provided along the travelling route including a carrying-in station to which the transportation vehicle transports a container and a carrying-out station from which the transportation vehicle transports the container and picked commodities, a shipment area provided along an outer periphery of the travelling route, and a controller configured and programmed to control the transportation vehicle, the picking method comprising:
transporting a container containing ordered commodities from the racks to the carrying-in station by the transportation vehicle under the control of the controller;
picking the ordered commodities from the container at the picking unit; and
transporting the picked commodities to the shipment area and the container after picking the commodities to the racks by the transportation vehicle under the control of the controller; wherein
the travelling route includes rails provided in a ceiling space of a building; and
the transportation vehicle includes a carriage travelling along the rails and including a hoist to drive a suspension member, a mast attached to the carriage in a vertically downward direction, and an elevation platform guided by the mast, raised and lowered by the suspension member, and including a transfer device.

\* \* \* \* \*